United States Patent [19]
Norel et al.

[11] 4,289,025
[45] Sep. 15, 1981

[54] SONDE WITH ROTATABLE PAD FOR CARRYING OUT LOGGING MEASUREMENTS IN A BOREHOLE

[75] Inventors: Guy Norel, La Celle Saint Cloud; Robert Desbrandes, Sevres, both of France

[73] Assignee: Institut Francais du Petrole, Rueil-Malmaison, France

[21] Appl. No.: 120,037

[22] Filed: Feb. 11, 1980

[30] Foreign Application Priority Data

Feb. 9, 1979 [FR] France ............................. 79/03565

[51] Int. Cl.³ ............................................. E21B 49/00
[52] U.S. Cl. ........................................ 73/152; 73/639
[58] Field of Search ................. 73/151, 152, 594, 635, 73/639; 324/347, 348; 250/268; 367/25, 35, 911, 912

[56] References Cited

U.S. PATENT DOCUMENTS

| 2,307,887 | 1/1943 | Haynes | 324/347 |
| 3,795,141 | 3/1974 | Planche | 73/151 |

*Primary Examiner*—Jerry W. Myracle
*Attorney, Agent, or Firm*—Millen & White

[57] ABSTRACT

The sonde comprises a measuring wheel carried by an arm which holds it in contact with the borehole wall and rotates it around the sonde axis so that the measuring wheel follows a helical path on the borehole wall as the sonde is raised in the borehole.

7 Claims, 7 Drawing Figures

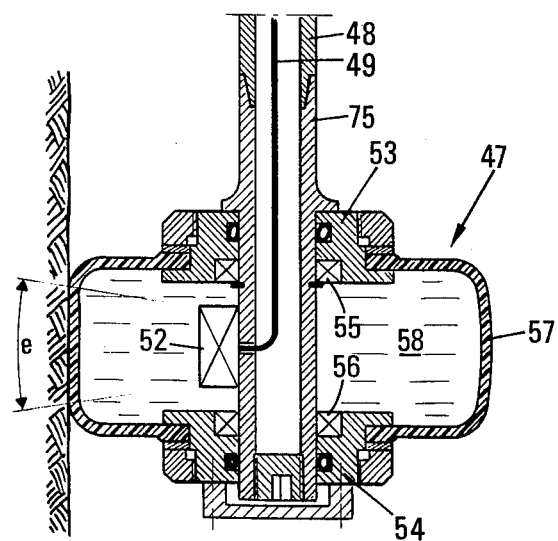
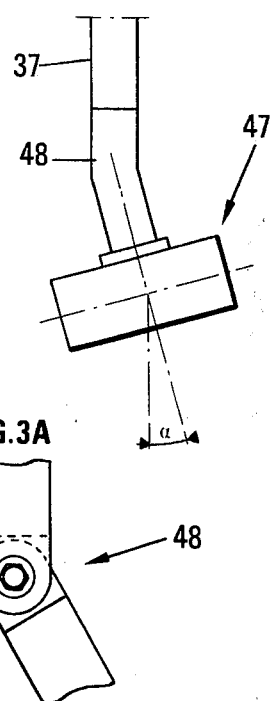
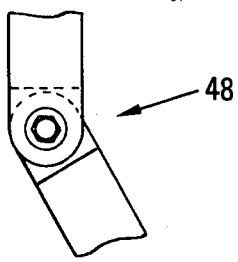
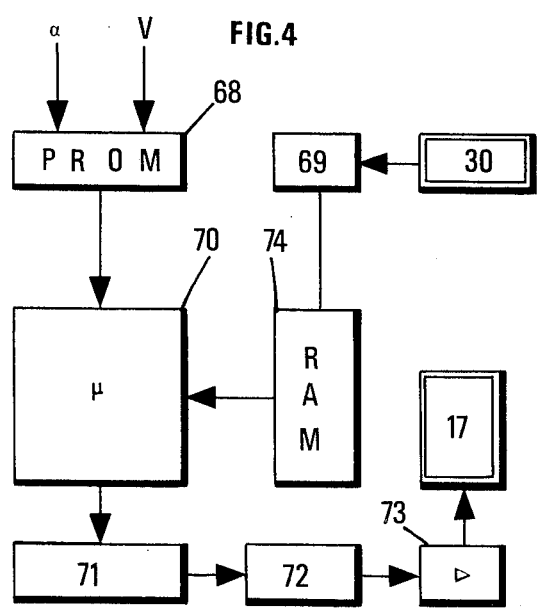
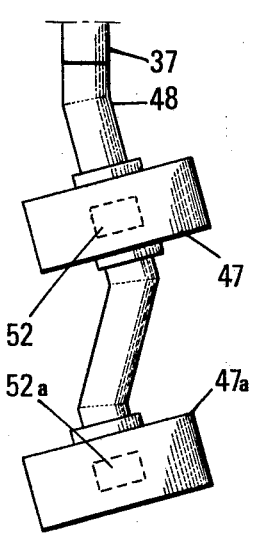

SONDE WITH ROTATABLE PAD FOR CARRYING OUT LOGGING MEASUREMENTS IN A BOREHOLE

BACKGROUND OF THE INVENTION

The present invention relates to a new type of sonde to carry out logging measurements in a hole drilled through geological formations.

It is already known to use sondes provided with active elements or transducers (transmitters and receivers) to perform measurements in either cased or uncased boreholes.

The purpose of such measurements is, for example, to determine geological characteristics of the drilled formations, or to ascertain whether metallic tubings positioned in the borehole are properly cemented, etc.

Two sonde types are presently used. In the first type of sonde the transducers are fixed to the sonde body or to pads integral with this body and are in contact with the borehole wall. Embodiments of this first type of sonde are, for example, illustrated in French Patent specification No. 1,121,292 and U.S. Pat. Nos. 2,855,685; 3,356,146 and 3,798,966.

The main drawback of this type of sonde is the wear of the transducers resulting from their friction on the borehole wall during the displacement of the sonde. A further drawback arises, at least in the case of measurements performed in open holes, from the uncertainty as to a proper contact between the transducers and the borehole wall, owing to cross-section variations of the borehole along its height.

This requires an interpretation of the measurements which is always difficult and time-consuming. It should be also noted that the displacement of this type of sonde is sometimes made difficult by the mud "cake" of variable thickness which covers the borehole wall. Moreover this type of sonde provides measurements only over a limited portion of the periphery of the borehole.

A second type of sonde has been designed to prevent the wear of the transducers. In this type of sonde the transducers carried by the sonde body are not in contact with the borehole wall. This is obtained by aligning the sonde body with the borehole axis by using centering means. The irregular shape of the borehole cross-section makes this centering operation difficult. There results therefrom a substantial alteration of the measurements which is further altered by possible variations of some characteristics of the mud filling the borehole, such as, for example, the specific gravity thereof. An interpretation of the performed measurements is therefore also necessary. Modifications of this type of sonde make it also possible to carry out measurements substantially along a generatrix of the borehole, but if the transducers are mounted for rotation about the sonde axis it is possible to perform measurements in all directions. Examples of embodiments of this second type of sonde are shown in by British Pat. No. 1,217,544 and U.S. Pat. Nos. 3,378,097 and 3,614,891.

It is also known in the art of electric logging to use circular electrodes rotatable about axes perpendicular to the sonde axis, these electrodes being preferably provided with teeth capable of performing the mud cake so as to come into direct contact with the geological formations (U.S. Pat. No. 2,307,887).

SUMMARY OF THE INVENTION

The object of the present invention is to provide a new type of sonde which does not suffer from the drawbacks of the prior art sondes while retaining their main advantages.

BRIEF DESCRIPTION OF THE DRAWINGS

The invention will be readily understood and all its advantages made apparent by the following description of a non-limitative embodiment of this new type of sonde, illustrated by the accompanying drawings, wherein:

FIG. 2 is a diagrammatic cross-section view of the measuring wheel, FIG. 3 is a partial view along in the direction of arrow F of FIG. 1, FIG. 3A is an alternative embodiment of the crank connector, FIG. 4 diagrammatically illustrates the automatic control of the speed of rotation of the arm carrying the measuring wheel, as a function of the sonde displacement along the drilled hole, and FIG. 5 shows an alternative embodiment.

DETAILED DISCUSSION OF THE INVENTION

Figure 1A:
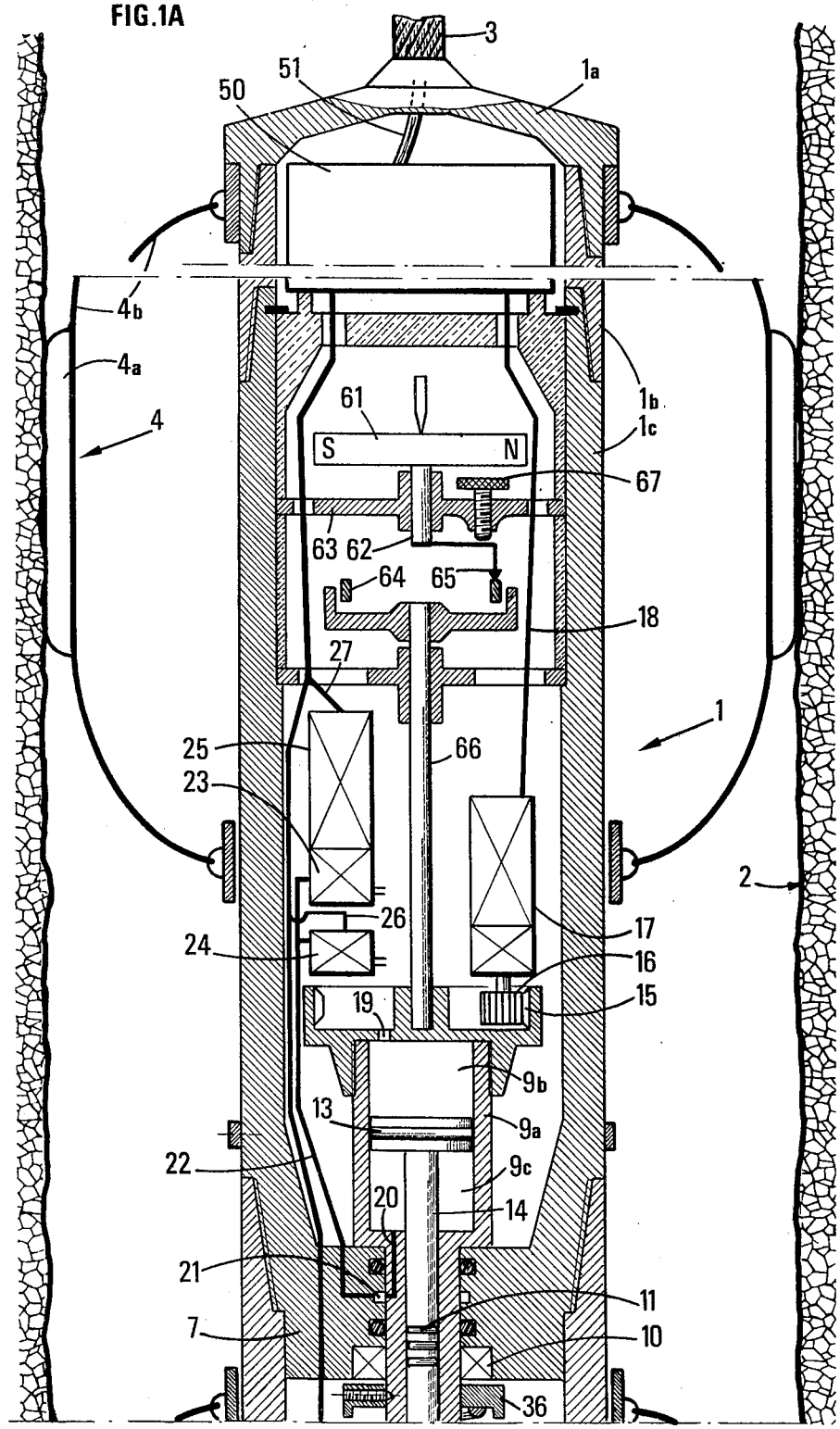
FIGS. 1A and 1B diagrammatically shows in cross-section an embodiment of the sonde according to the invention.
Figure 1B:
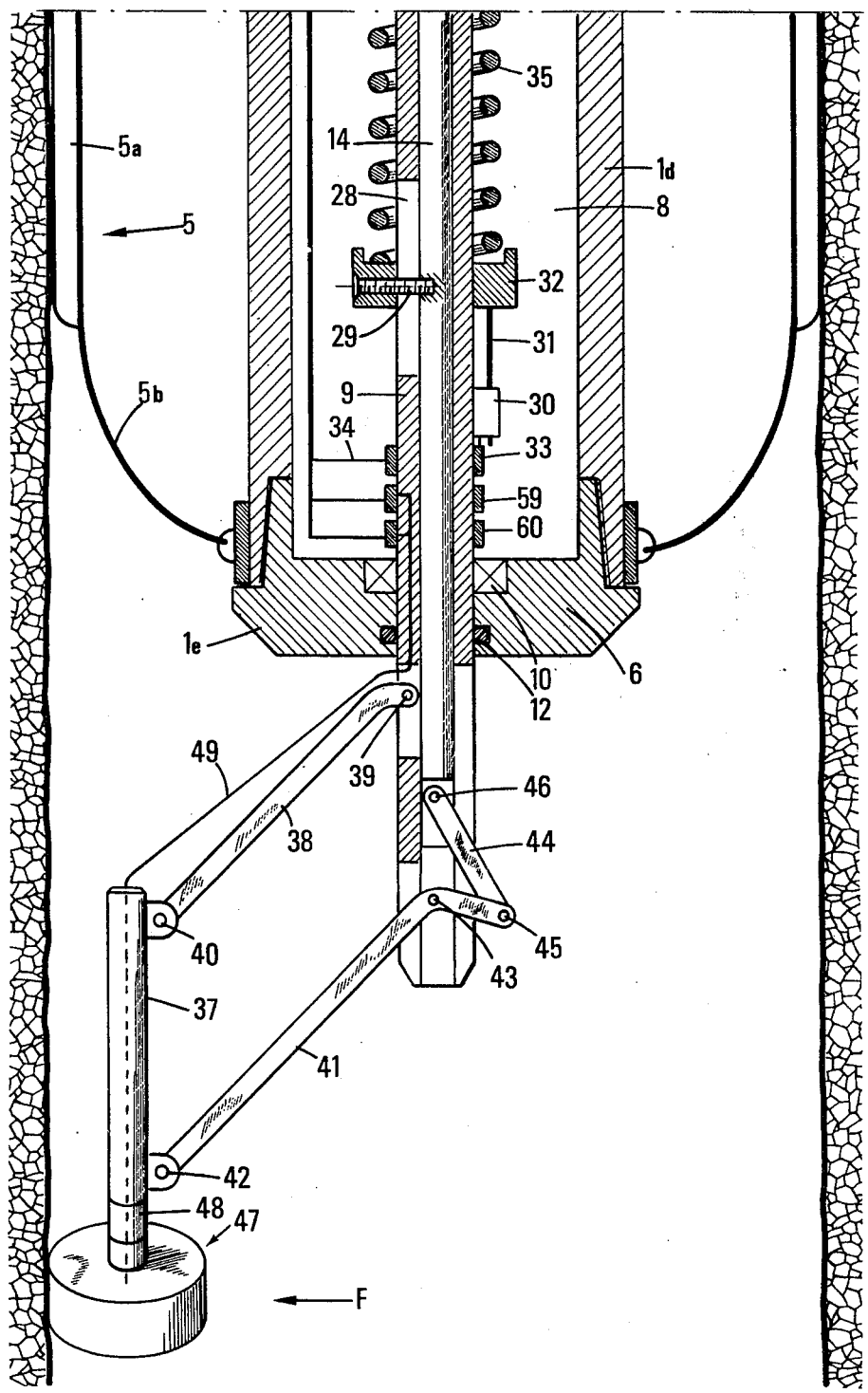

The sonde according to the invention whose upper part is shown in FIG. 1A and the lower part in FIG. 1B, comprises a body designated as a whole by reference 1. This body, formed of several interconnected elements 1a, 1b, 1c, 1d and 1e, has an outer diameter smaller than the diameter of the borehole where the sonde is positioned during the measurements. The sonde is suspended in a known manner from a cable or handling line 3.

The sonde is eqipped with at least two centering members 4 and 5 which maintain it substantially in alignment with the borehole axis. These centering members may be of any known type and comprise, for example, sliding pads such as 4a and 5a cooperating with resilient blades 4b and 5b. The pads 4a and 5a are profiled so as to slide along the wall of the borehole 2 without damaging the mud cake which may cover the borehole wall.

In the lower part of the body 1, two bearings 6 and 7 define a lower chamber 8. A rotary tubular shaft or sleeve 9 is held by the bearings 6 and 7 along the sonde axis. Roller means, such as ball or roller bearings 10, facilitate the rotation of the shaft 9 with respect to the body 1. Sealing of the sonde is ensured by sealing gaskets 12.

At its upper part 9a, the bore of the tubular shaft 9 is of greater diameter and receives a piston 13 displaceable in this bore.

The piston 13 and the part 9a of the shaft 9 co-operate to form a jack. A rod 14, integral with the piston 13, is housed in the bore of shaft 9 and extends down to the lower part of this shaft. Gaskets 11 provide for sealing between the rod 14 and the tubular shaft 9.

The upper end of the shaft 9 carries a toothed crown 15 meshing with a pinion 16 which is itself rotated by a motor and speed reducing gear aggregate 17 secured within the body 1. The motor of this aggregate is electrically powered through a cable diagrammatically indicated at 18. The electric motor is preferably a synchronous motor whose angular rotation speed ω is adjustable by variation of the frequency of the electric current supplied to the motor.

The piston 13 divides the bore into two chambers wherein it is displaceable. The lower chamber 9c communicates with a pipe 22 supplying pressurized fluid through a pipe 20 opening in a groove 21 arranged in the bearing 7. The pipe 22 is connected at one end to the outlet orifice of a pump 23 and at its other end to one of the orifices of a two-way, two-positions electrically actuated valve 24. The inlet orifice of the pump 23 and the second orifice of the valve 24 communicate with the inner part of the body 1.

The pump 23 can be actuated by an electric motor 25 to feed the chamber 9c with pressurized hydraulic fluid.

Multi-conductor wires diagrammatically shown at 26 and 27 allow control of the electrically actuated valve 24 and the motor 25 as described below.

The rotary tubular shaft 9 is positioned in the extension of the sonde body. A longitudinal groove 28 provided in the shaft 9 co-operates with a pin 29, integral with the rod 14, to rotatably secure the shaft 9 and the rod 14 to each other.

Means are provided for measuring the axial displacement of the rod 14 relative to the shaft 9. Such means may, for example, include a rectilinear potentiometer 30 secured to the shaft 9 and whose slider 31 is connected to a ring 32 integral with the pin 29 and slidable on the rotary shaft 9. A terminal of the potentiometer 30 is electrically connected to ground. The slider 31 is electrically connected to a ring 33 carried by the shaft 9. This ring is connected through a brush to an electrical conductor 34.

The sonde also includes means for automatically displacing the rod 14 towards the bottom of the drawing in the absence of any external force. Such means may, for example, include a compression spring 35 bearing at one end against the ring 32 and at its other end against a ring 36 integral with the shaft 9.

An arm 37, positioned parallel to the sonde body is connected to the rod 14 and to the rotary shaft 9 by an assembly of hinged rods.

This rod assembly comprises:
a rod 38 articulated at one end 39 on the rotary shaft 9 and at its other end 40, articulated on the arm 37,
a lever 41 having one end 42 articulated on the arm 37 and its other end articulated on the shaft 9; the points of articulation 39, 40, 42 and 43 are located at the apices of a parallelogram defined by the arm 37, the shaft 9, the rod 38 and the lever 41,
a crank arm 44 having one end 45 articulated on the lever 41, and its other end 46 articulated on the rod 14. This crank arm causes a displacement of the arm 37 in relation with the displacement of the rod 14 relative to the shaft 9.

A measuring device, designated as a whole by reference numeral 47, is secured to the arm 37 by means of a coupling member 48. This device is electrically connected to the sonde through a cable 49.

In the upper part of the sonde are housed all the electronic circuits 50 required for its operation. This circuit assembly is connected to the surface through a cable 51 which transmits data and electric signals as well as the electric power energizing the sonde. This cable, which may include several conductors, may or may not be embedded in the handling cable 3.

FIG. 2 is a diagrammatic cross-section view of an embodiment of the measuring device 47. It comprises a shaft 75 to which is secured a sensitive element or transducer 52 adapted to perform the intended measurement. For example, but not limitatively, this element may be a device for transmitting and receiving acoustic waves, comprising in particular a piezo-electric crystal. Such a transducer is well known in the art and will not be described here.

The shaft 75 also carries rotary flanges 53 and 54 whose rotation is facilitated by roll bearings 55 and 56. On these flanges is mounted a casing 57 made of a flexible material, such as an elastomere. This casing has the general shape of a tire and defines a sealed chamber 58 around the device 52. This chamber is filled with a fluid whose characteristics (mechanical, acoustical characteristics, etc) are accurately known. For example, in the case where the device 52 is an acoustic transmitter-receiver, this fluid may be water.

Thus the measuring device, 47 has the shape of a wheel which is in contact with the wall of the drilled during the measurement.

By using such a device, the transmission of the acoustic wave always occurs through the liquid filling the wheel and through the tire 57 whose acoustic characteristics are also accurately known.

The wheel 57 is secured to the arm 37 through a crank connector 48 so that the axes of this connector and the axis of the arm 37 are contained in a plane parallel to the axis of the sonde body and perpendicular to the plane defined by the axes of the rod 38 and of the lever 41.

The connector 48 is bent so that the axis of the wheel 47 forms an angle α with a vertical line. The value of this angle is pre-adjusted before the sonde is lowered into the borehole, either by using a connector 48 having determined geometrical configuration or by using a connector capable of adjustable articulation, as shown in FIG. 3A.

Rotary electrical contacts such as those diagrammatically shown at 59 and 60 enable electric signals to be transmitted to and from the electric circuits 50 and the transducer 52 and vice-versa.

The sonde is also provided with means adapted to detect the position of the plane of the parallelogram 37, 38, 9 and 41 which defines the orientation of the wheel 47, for example with respect to the magnetic north.

Such means (FIG. 1A) may comprise a magnetized bar 61 which is freely rotatable about its shaft 62 carried by a bearing 63 secured to the body 1. A circular potentiometer 64, integral with the shaft 9 and, for example, carried by a supporting-rod 66, has its slider mechanically connected to the axis 62. By this means, the relative position of the slider and the potentiometer allows to detection of the azimuthal position of the shaft 9 at anytime and hence, of the wheel 47. The electrical connections between this potentiometer and the slider have not been shown in FIG. 1A for sake of clarity.

When the measurements are carried out in a cased borehole, the position of the measuring wheel cannot be detected by reference to the magnetic north. In such a case the slider 64 is held by an insulated screw 67 (FIG. 1A) in a stationary position with respect to the sonde body. The position of the measuring wheel 47 is then determined with reference to this stationary position.

The sonde body 1 is filled with oil whose pressure can be maintained at the value of the fluid pressure in the borehole by any suitable known means (not shown) comprising, for example, a flexible membrane.

Prior to lowering the sonde into the borehole, the pump 23 is energized and the electrically-actuated valve 24 is held in its closed position. The pressurized fluid delivered by the pump is transferred to the chamber 9c.

The piston 13 is moved towards the upper part of the drawing and displaces the oil contained in the chamber 9b through the orifice 19. During its displacement the piston 13 carries the rod 14 with it. The latter compresses the spring 35 through the intermediary of the ring 32. Simultaneously this displacement of the rod 14 moves the crank arm 44 which rotates the lever 41 about its axis 43. The arm 37 and the measuring wheel 47 are moved towards the axis of the sonde body. The sonde can be lowered into the borehole since the wheel 47 is not in contact with the borehole wall.

When the sonde has reached the desired depth, the operation of the pump 23 is discontinued and the electrically-actuated valve 24 is opened. Under the action of the spring 35, the rod 14 is moved towards the lower part of the drawing. The crank arm 44 actuates the lever 41 to move the arm 37 away from the axis of the sonde body until the device 47 comes into contact with the borehole wall. Simultaneously the displacement of the rod 14 changes the position of the sliders of the rectilinear potentiometer 30. The position of this slider which is dependent on the linear displacement of the rod 14, is thus a function of the rotation of the lever 41 and consequently of the diameter of the borehole 2 or, more precisely, of the distance between the axis of the sonde and the borehole wall at the level where the wheel 47 is in contact with the borehole wall.

The transmitter-receiver 52 (FIG. 2) is then energized and the measuring operations can be started. By applying a pull on the cable 3, the sonde is raised in the borehole at a vertical speed V. Simultaneously the motor and the speed reducing-gear aggregate 17 drives the shaft 9 at a determined rotation speed as indicated below. The rotation of the shaft 9 causes the rotation of the arm 37. The wheel 47 rolls along the borehole wall describing an helix of pitch p.

A result of the foregoing is that the sonde according to the invention has a measuring device 47 which rolls along the borehole wall, thus avoiding the wear generated by friction. The measurements are never performed through the fluid feeding the borehole thus avoiding, on the one hand, any alteration of the measurements which might result from non-homogeneous characteristics of this fluid and, on the other hand, corrections which would be required as a result of an improper centering of the sonde. Moreover by using the sonde according to the invention it is possible to perform measurements in all directions, or in other words, to explore the entire side wall of the borehole.

In order to provide a rotation without sliding of the measuring wheel along the borehole wall, the following relationships must be satisfied between the linear speed of displacement V of the sonde body, the angular rotation speed $\omega$ of the shaft 9, the angle $\alpha$ of inclination of the measuring wheel, the radius R of the borehole at the level where the wheel is in contact with the borehole wall, and the pitch p of the helix followed by the measuring wheel:

$$V = \omega . R . tg\alpha \qquad (1)$$

$$p = 2\pi . R . tg\alpha \qquad (2)$$

and consequently:

$$\omega . p = 2\pi . V \qquad (3)$$

Generally the measurements are performed by displacing the sonde at speed V preferably of constant value and essentially dependent on the winch upon which the handling cable is reeled. In practice, this speed is lower than 1 meter/second. In the case of measurements performed in a cased wellbore, the values of the speed V and of the borehole radius are known. The value p of the pitch of the helix described by the wheel is preselected. This pitch may be equal to the width e of the wall portion explored by the transmitter 52 (FIG. 2), in the case where the whole wall surface of the borehole must be explored, but it may also be greater than e.

The inclination of the wheel is adjusted at a value $\alpha$ determined by the equation (2) and the shaft 9 is rotated at an angular speed $\omega$ determined by the equation (3). Most of the time this rotation speed will be constant for a constant selected speed V.

It is optionally possible to take into account variations in the speed V by controlling the angular rotation speed $\omega$ in relation to the speed V. This can be achieved by means of a synchronous motor fed with an electric current whose frequency is controlled by the value of V. Such an automatic regulation is well known in the art and will therefore not be described here.

In the case of uncased boreholes, the vertical speed V of the sonde and the value of the angle $\alpha$ are generally fixed. The value of the radius R of the borehole varies and the value of the angular rotation speed $\omega$ of the shaft 9 must be continuously adjusted.

This can be achieved for instance by an automatic regulation of the type illustrated in FIG. 4.

The values of $\alpha$ and V are stored in a memory 68 of the P.R.O.M. type. The value of the radius R of the borehole at the level of the wheel 47 is transmitted to the memory 74.

The value R is indicated by the position of the slider of the linear potentiometer 30. In fact, as above indicated, the position of this slider is dependent on the position of the rod 14. The position of the slider is thus representative of the position of the lever 41 resulting from the connection through the crank arm 44, and is thus representative of the position of the measuring wheel 47, i.e. of the value of the radius R of the borehole at the level of the contact of the measuring wheel with the borehole wall.

By measuring the electric resistance or voltage between the slider and one of the terminals of the potentiometer 30 there is obtained an analog signal representing the actual value of the radius R. This signal is converted to a digital one by an analog to digital converter 69, before being transmitted to the memory 74.

A microprocessor 70, for example of the programmable type, processes the data stored in the memories 68 and 74 according to the relationship (1) $V = \omega . R . tg\alpha$ and delivers a control signal representative of the value $\omega$ of the angular rotation speed of the shaft 9. This signal is transmitted to a digital-to-analog converter 71. The latter is connected to a voltage-frequency converter 72 which delivers a signal whose frequency f is a function of the control signal. After processing in a power amplifier 73, the signal at the frequency f feeds the synchronous motor 17 whose rotation speed is thus adjusted as a function of the control signal transmitted by the microprocessor 70.

The circuits illustrated in FIG. 4 are housed in the sonde and are part of the assembly of circuits 50.

The signals delivered by the device 52, those delivered by the means for detecting the position of the wheel with respect to a reference direction (potentiometer 65), as well as the signals emanating from the means for measuring the radius R of the borehole at the level where the measuring wheel is in contact with the borehole wall are transmitted to the surface through the cable 51. These signals may optionally be suitably processed in the assembly of circuits 51 such as by coding . . . etc . . . to permit an accurate transmission through the cable 51. Such processing methods which are well known in the art, form no part of this invention and will therefore not be described here.

The signal representative of the value of the radius R permits the determination of the pitch of the helix described by the measuring wheel, by using the formula (2) $p = 2\pi.R.tg\alpha$.

This determination can be effected at the surface or in an electronic circuit housed in the sonde. In this last case, instead of transmitting the signal representing the value of the radius R it is possible to transmit the signal representing the pitch p.

Detection of the position of the measuring wheel and determination of the value of the pitch p permit the exploitation of the measurements performed by the device 52, irrespective of defects in the centering of the sonde body which might occur during the displacement of the sonde.

As above indicated, the value of the angle $\alpha$ is selected as a function of the pitch of the helix described by the measuring wheel. This angle may vary from a minimum value for which the helix pitch is substantially equal to the exploration range e permitted by the device 52 and a maximum value equal to $\pi/2$. For this last value the pitch of the helix described by the measuring wheel is infinite, i.e. this wheel is vertically displaceable substantially along a rectilinear generatrix of the borehole, while the angular rotation speed $\omega$ of the shaft 9 is equal to zero as shown by the relationship (3).

Alternative embodiments of the sonde can be devised without departing from the scope of the present invention. For example in the case where the transducer 52 is an acoustic wave transmitter and/or receiver, an additional detector can be provided to measure the sound velocity in the direction parallel to the borehole axis.

The transducer 52 may also include a Y-ray detector, an oscillating circuit, or a coil for transmitting and/or receiving a magnetic field, or a radioactive source ($\gamma$ or neutrons). In this last case, the sonde body will be provided with a stationary or rotary detector of the radioactive rays, this detector being preferably located at a lower level than the measuring wheel, on an extension of the body 1 provided to this end.

In the case of measurements effected with separate transmitter and detector, it will be possible, as illustrated in FIG. 5, to equip the arm 37 with two parallel wheels 47 and 47a, one of which carries the transmitter means 52 and the other the receiver means 52a, these wheels being, for example, located one above the other.

It will be also possible without departing from the scope of the present invention to equip the sonde with several measuring wheels carried by separate arms, these wheels being located at the same level or at different levels.

We claim:

1. A sonde for carrying out logging measurements in a borehole, comprising a body having an outer diameter smaller than the diameter of the borehole, means for centering said sonde body in the borehole, at least one measuring device comprising a transducer, handling means for displacing said measuring device from a position of contact with the borehole wall to a position spaced apart from said wall and vice-versa, means for rotating said measuring device about the sonde axis, means for detecting the angular position of said measuring device with respect to a reference direction, and connecting means for transmitting the signals delivered by the sonde, wherein said measuring device comprises a shaft whose axis, maintained in a plane parallel to the sonde axis is inclined to said axis by an angle comprised between 0° and 90°, and at least one wheel carried by said shaft and freely rotatable thereabout, said wheel delimiting a sealed chamber whose characteristics are accurately known, said transducer being carried by said shaft within said wheel.

2. A measuring sonde according to claim 1, comprising means for displacing the sonde in the borehole at a determined speed V during the measuring periods, means for determining the distance R between the axis of the sonde body and the zone of contact of said wheel of the measuring device with the borehole wall, and automatic control means adapted to adjust the angular rotation speed of the shaft at a value $\omega$ complying with the relationships $V = \omega.R.tg\alpha$, $p = 2\pi.R.tg\alpha$ and $\omega.p = 2\pi V$, wherein p is the linear displacement of the sonde body after a complete resolution of said shaft about the sonde axis.

3. A measuring sonde according to claim 1, wherein said means for rotating said shaft about the axis of the sonde body comprises a rotatable sleeve held in position along said axis by bearings and carrying a toothed wheel which co-operates with a pinion fast in rotation with the outlet shaft of a motor and speed reducing gear aggregate, said shaft and said sleeve being fast in rotation with each other.

4. A measuring sonde according to claim 3, wherein said handling means comprise an arm to which said shaft is connected through a crank connector forming the angle $\alpha$, said arm being parallel to the axis of the sonde body, a rod and a lever articulated at one end on said arm and at the other end on said sleeve, a control rod housed in said sleeve and axially slidable with respect thereto, while being fast in rotation with said sleeve, a crank arm articulated on said lever and on said control rod, a jack comprising a cylinder integral with said sleeve and a piston connected to said control rod, and a source of pressurized fluid adapted to feed said jack so as to displace said control rod against the action of resilient means and for moving said shaft towards the axis of the sonde body.

5. A measuring sonde according to claim 4, comprising at least a second transducer connected to the sonde body.

6. A measuring sonde according to claim 4, comprising a second measuring device provided with a second transducer carried by said arm.

7. A measuring sonde according to claim 4, comprising a plurality of measuring wheels carried by separate arms.

* * * * *